United States Patent
Houck

(10) Patent No.: US 12,449,305 B2
(45) Date of Patent: Oct. 21, 2025

(54) OPTICAL SENSOR DEVICE

(71) Applicant: VIAVI Solutions Inc., Chandler, AZ (US)

(72) Inventor: William D. Houck, Santa Rosa, CA (US)

(73) Assignee: VIA VI SOLUTIONS INC., Chandler, AZ (US)

( * ) Notice: Subject to any disclaimer, the term of this patent is extended or adjusted under 35 U.S.C. 154(b) by 243 days.

(21) Appl. No.: 18/171,221

(22) Filed: Feb. 17, 2023

(65) Prior Publication Data

US 2023/0266167 A1  Aug. 24, 2023

Related U.S. Application Data

(60) Provisional application No. 63/268,423, filed on Feb. 23, 2022.

(51) Int. Cl.
  *G01J 3/12* (2006.01)
  *G01J 1/06* (2006.01)
  *G01J 3/28* (2006.01)

(52) U.S. Cl.
  CPC . *G01J 3/12* (2013.01); *G01J 1/06* (2013.01); *G01J 3/28* (2013.01); *G01J 2003/1226* (2013.01)

(58) Field of Classification Search
  CPC ........ G01J 3/12; G01J 1/06; G01J 3/28; G01J 2003/1226; G01J 1/029; G01J 1/0488; G01J 1/4228; G01J 1/0266
  See application file for complete search history.

(56) References Cited

U.S. PATENT DOCUMENTS 6,678,632 B1 * 1/2004 Iannarilli, Jr. ......... G01N 21/21
                                                702/153
7,561,274 B2 * 7/2009 Brady ....................... G01J 3/26
                                                356/454
(Continued)

FOREIGN PATENT DOCUMENTS

WO   2009096405 A1   8/2009
WO   2022018527 A1   1/2022

OTHER PUBLICATIONS

Experimental Specification for Optical High Data Rate Communication; Optical High Data Rate (HDR) Communication-1064 NM; Dec. 2018; The Consultative Committee for Space Data Systems (CCSDS); Orange Book, Issue 1; Washington, DC, USA; 57 pages.
(Continued)

*Primary Examiner* — Jonathan M Hansen
(74) *Attorney, Agent, or Firm* — FOLEY & LARDNER LLP

(57) ABSTRACT

An optical sensor device includes an optical filter, an optical element, and an optical sensor that includes a plurality of sensor elements. The optical filter is configured to pass, to the optical element, first light beams that are associated with a first subrange of a spectral range and that impinge on the optical filter within a first incidence angle range; and to pass, to the optical element, second light beams that are associated with a second subrange of the spectral range and that impinge on the optical filter within a second incidence angle range. The optical element is configured to cause, based on receiving the first light beams, the first light beams to be directed to a first region of an optical sensor; and to cause, based on receiving the second light beams, the second light beams to be directed to a second region of the optical sensor.

20 Claims, 9 Drawing Sheets

(56) References Cited

U.S. PATENT DOCUMENTS

| | | | |
|---|---|---|---|
| 8,542,348 B2* | 9/2013 | Hardegger | G01S 17/86 356/3.01 |
| 9,377,396 B2* | 6/2016 | Goldring | G01J 3/0256 |
| 2006/0274308 A1* | 12/2006 | Brady | G01J 3/36 356/326 |
| 2007/0091315 A1* | 4/2007 | Brady | G01J 3/0208 356/451 |
| 2012/0105823 A1* | 5/2012 | Hardegger | G01S 17/86 356/6 |
| 2018/0136042 A1* | 5/2018 | Goldring | G01J 3/10 |
| 2021/0239528 A1 | 8/2021 | Houck et al. | |
| 2021/0372920 A1* | 12/2021 | Ehbets | G01J 3/0202 |
| 2023/0140321 A1* | 5/2023 | Inoue | G01S 17/42 701/301 |

OTHER PUBLICATIONS

Extended European Search Report for Application No. EP23158033, mailed on Jun. 26, 2023, 8 pages.

\* cited by examiner

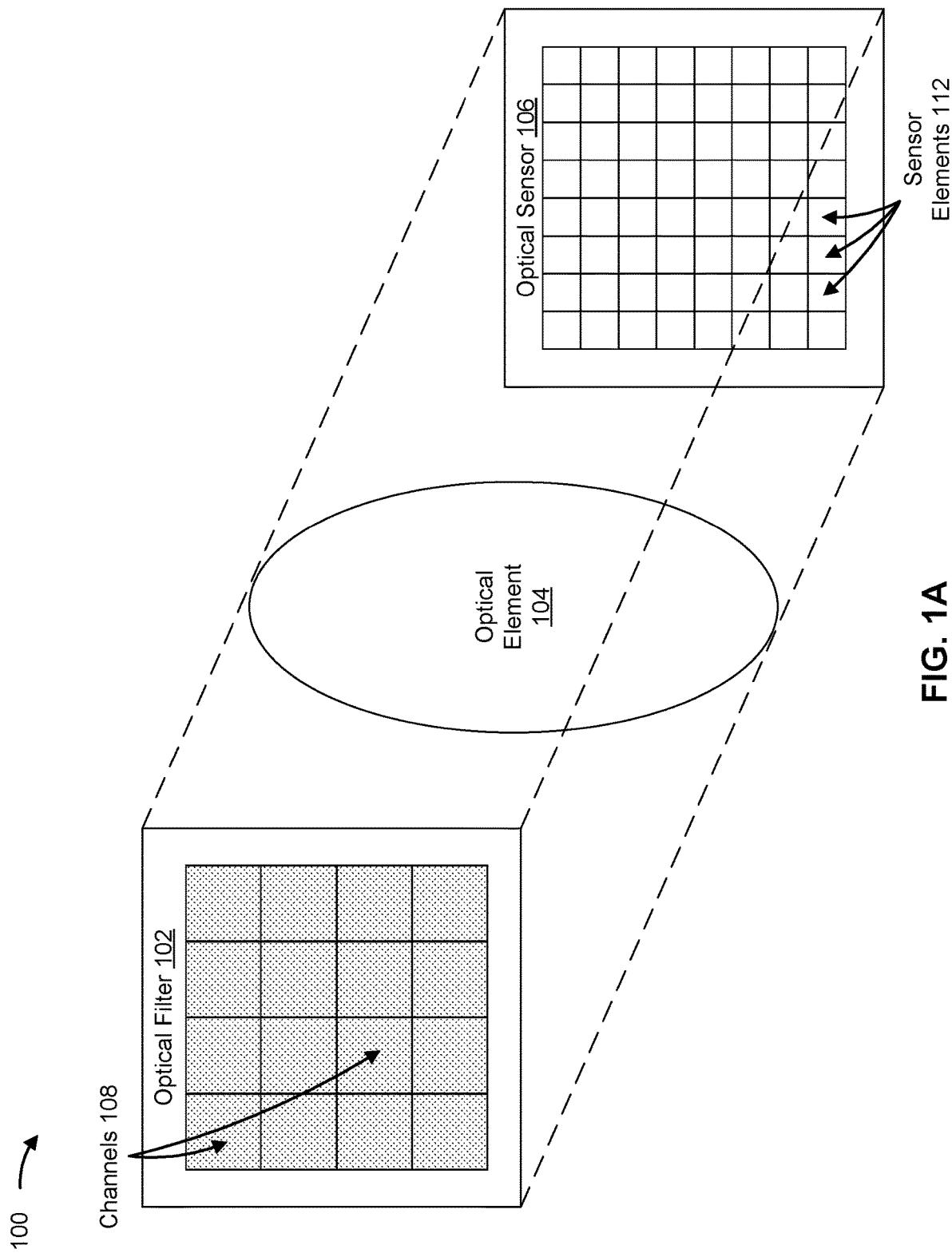

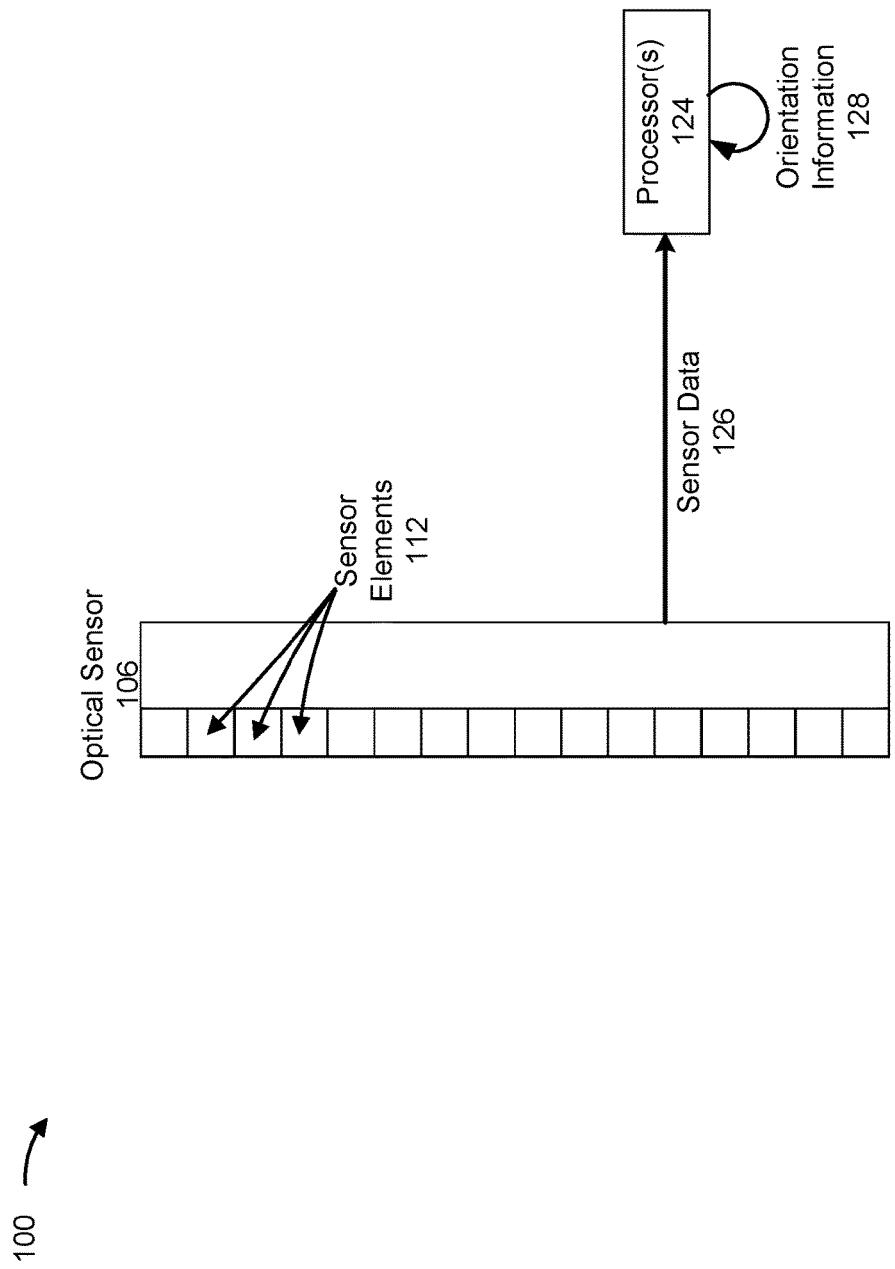

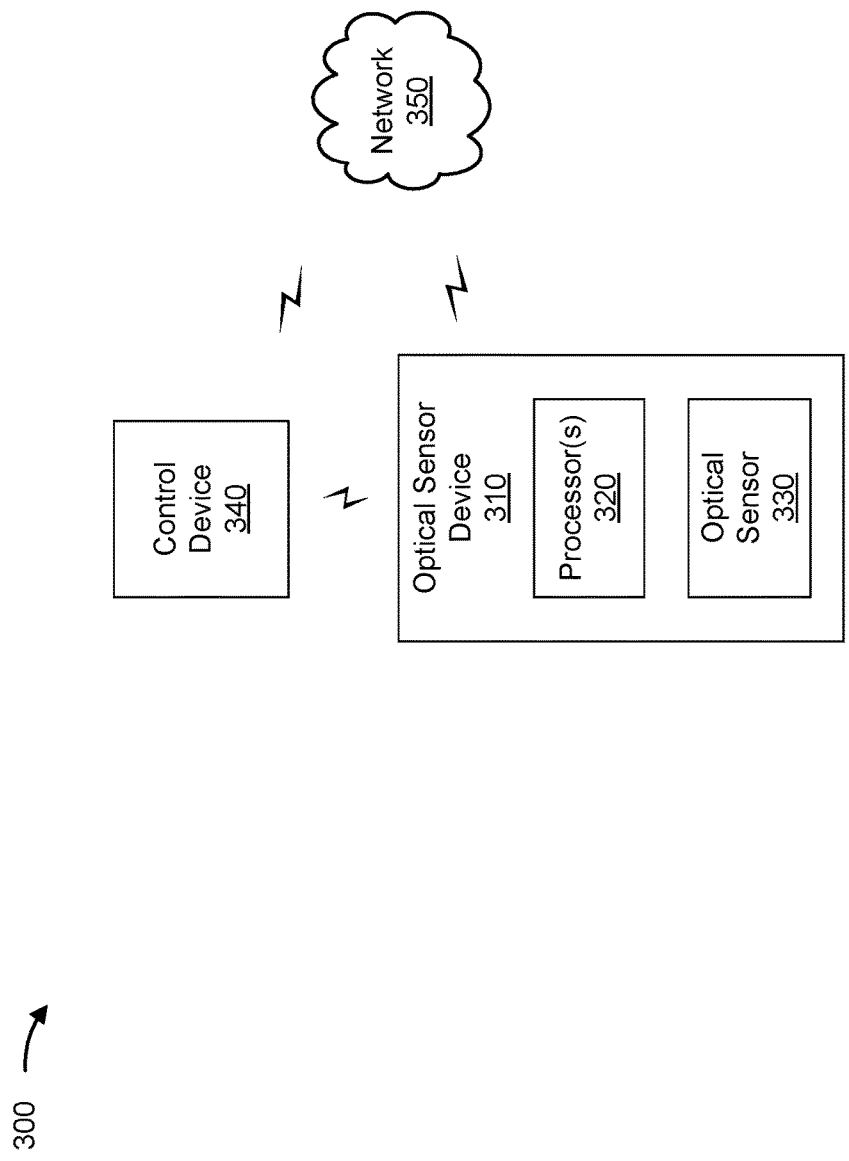

OPTICAL SENSOR DEVICE

CROSS-REFERENCE TO RELATED APPLICATION

This Patent Application claims priority to U.S. Provisional Patent Application No. 63/268,423, filed on Feb. 23, 2022, and entitled "SPECTROPLENOPTIC POSITION SENSOR." The disclosure of the prior Application is considered part of and is incorporated by reference into this Patent Application.

BACKGROUND

An optical sensor device may be utilized to capture information concerning light. For example, the optical sensor device may capture information relating to a set of wavelengths associated with the light. The optical sensor device may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical sensor device includes an optical filter that includes a plurality of channels that are configured to pass light beams associated with a spectral range; an optical element; an optical sensor that includes a plurality of sensor elements, wherein: the optical filter is configured to: pass, to the optical element, first light beams that are associated with a first subrange of the spectral range and that impinge on the optical filter within a first incidence angle range, and pass, to the optical element, second light beams that are associated with a second subrange of the spectral range and that impinge on the optical filter within a second incidence angle range; and the optical element is configured to: cause, based on receiving the first light beams, the first light beams to be directed to a first set of one or more sensor elements of the plurality of sensor elements of the optical sensor, and cause, based on receiving the second light beams, the second light beams to be directed to a second set of one or more sensor elements of the plurality of sensor elements of the optical sensor.

In some implementations, an optical sensor device includes an optical filter that includes a plurality of channels; and an optical element, wherein: a channel, of the plurality of channels of the optical filter, is configured to: pass, to the optical element, first light beams that are associated with a first subrange of a spectral range and that impinge on the channel within a first incidence angle range, and pass, to the optical element, second light beams that are associated with a second subrange of the spectral range and that impinge on the channel within a second incidence angle range; and the optical element is configured to: cause, based on receiving the first light beams, the first light beams to be directed to a first set of one or more sensor elements of an optical sensor, and cause, based on receiving the second light beams, the second light beams to be directed to a second set of one or more sensor elements of the optical sensor.

In some implementations, an optical sensor device includes an optical filter; and an optical element, wherein: the optical filter is configured to: pass, to the optical element, first light beams that are associated with a first subrange of a spectral range and that impinge on the optical filter within a first incidence angle range, and pass, to the optical element, second light beams that are associated with a second subrange of the spectral range and that impinge on the optical filter within a second incidence angle range; and the optical element is configured to: cause, based on receiving the first light beams, the first light beams to be directed to a first region of an optical sensor, and cause, based on receiving the second light beams, the second light beams to be directed to a second region of the optical sensor.

BRIEF DESCRIPTION OF THE DRAWINGS

FIGS. 1A-1D are diagrams of an example implementation described herein.

FIG. 3 is a diagram of an example environment in which systems and/or methods described herein may be implemented.

DETAILED DESCRIPTION

Figure 1B:
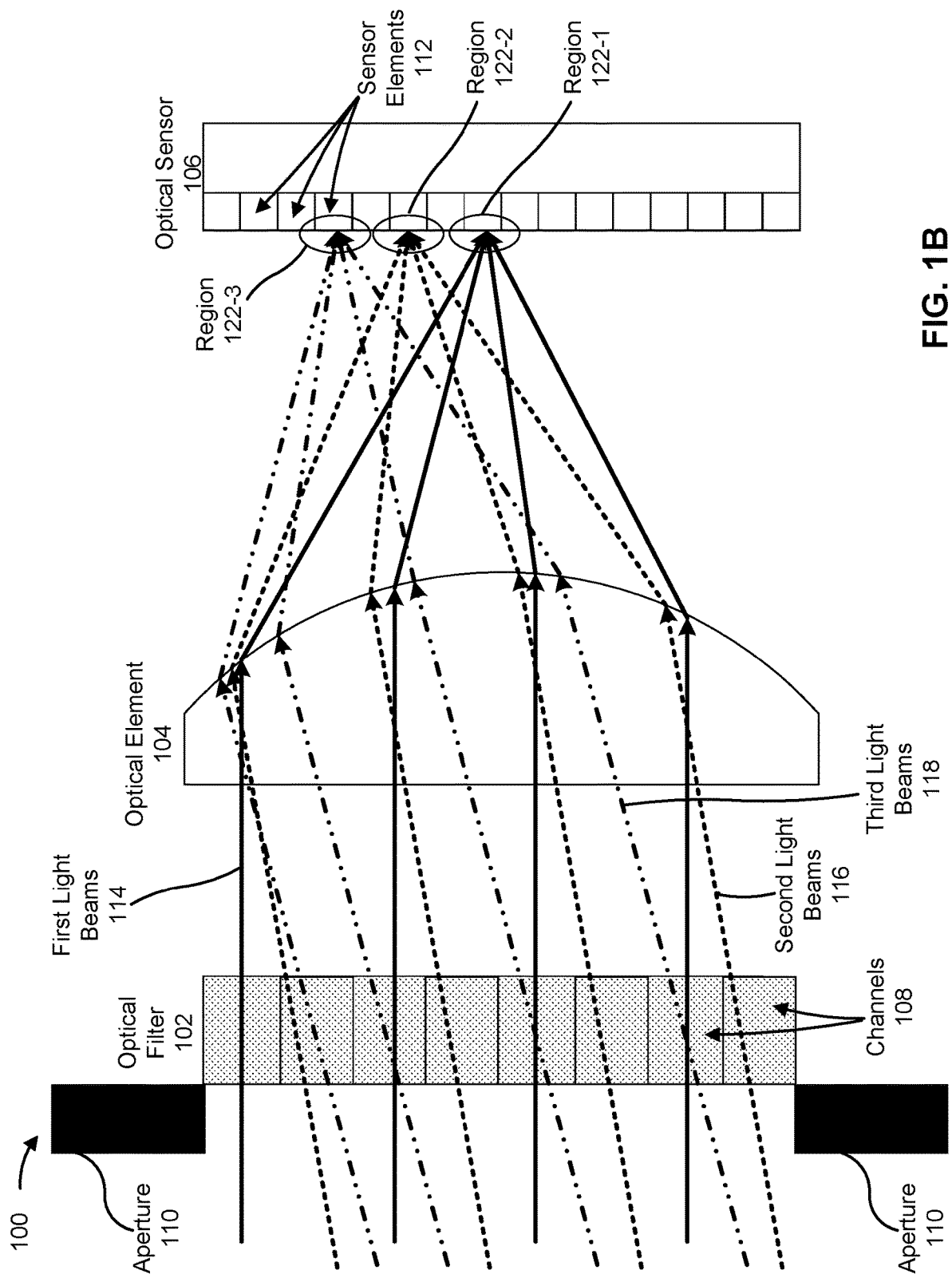

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

In order to establish optical communication (e.g., using laser beams) between two optical communication devices, such as satellites, the optical communication devices are required to perform a "spatial acquisition" sequence to ensure that the optical communication devices are oriented to each other (e.g., to enable transmission and reception of laser beams between the optical communication devices). Such a sequence requires co-aligning a line of sight field of view of a receiver of a first optical communication device and a transmit beam of a transmitter of a second optical communication device (e.g., based on respective positions of the optical communication devices). However, spatial acquisition is often difficult to achieve and requires implementation of multiple "scanning" schemes by the first optical communication device, where the receiver of the first optical communication device and/or the first optical communication device are physically moved to many different positions to compare relative intensities and wavelengths of light associated with the transmit beam sent by the transmitter of the second communication device. Ultimately, the receiver and/or the first optical communication device are moved to an optimal position to "lock in" on a relative position of an origin of the transmit beam (that is associated with the transmitter of the second communication device). Consequently, a spatial acquisition sequence is costly (e.g., in terms of fuel or other resources to enable movement of the receiver and/or the first optical communication device), complex, and time-consuming.

Some implementations described herein provide an optical sensor device that includes an optical filter, an optical element (e.g., that includes lens and/or a metasurface), and an optical sensor. The optical filter has an angle shift characteristic associated with a spectral range. Accordingly, the optical filter passes first light beams associated with a first subrange of the spectral range when the first light beams impinge on the optical filter within a first incidence angle range, passes second light beams associated with a second subrange of the spectral range when the second light beams impinge on the optical filter within a second incidence angle range, and so on. The optical element causes the first light beams to be directed to a region of the optical sensor associated with a first set of sensor elements, causes the second light beams to be directed to a region of the optical sensor associated with a second set of sensor elements, and so on. Accordingly, each set of sensor elements is associated with a particular subrange of the spectral range and a particular incidence angle, and hence the optical sensor device may be referred to a "spectroplenoptic sensor device," or a "spectroplenoptic position sensor." Further, one or more processors of the optical sensor device may be configured to process sensor data (e.g., generated by the sets of sensor elements of the optical sensor) to determine orientation information that indicates an orientation of the optical sensor device in relation to an origination point of the light beams.

In this way, the optical sensor device is capable of providing an indication of the orientation of the optical sensor device (e.g., in relation to the origination point of the light beams) based on a single observation of the light beams (e.g. without using a conventional scanning scheme). Accordingly, an optical communication device, such as a satellite, that includes the optical sensor device, does not need to waste resources (e.g., in terms of fuel or other resources) and/or time to move the optical sensor device and/or the optical communication device to make an orientation determination. A complex spatial acquisition sequence does not need to be performed. Further, the optical sensor device is a solid state device (e.g., without moving components), and therefore is more durable and less likely to suffer from wear and tear than a typical receiver of an optical communication device. This improves a reliability and operative performance of the optical sensor device (as compared to a typical receiver). Accordingly, the optical sensor device may be used to facilitate orienting any two optical communication devices, such as satellites, or other devices that utilize optical communication, such as drones, auto-docking mechanisms, or other devices.

FIGS. 1A-1D are diagrams of an example implementation 100 described herein. As shown in FIG. 1A, example implementation 100 includes an optical filter 102, an optical element 104, and/or an optical sensor 106. The optical filter 102, the optical element 104, and/or the optical sensor 106 may be associated with an optical sensor device, which is described in more detail elsewhere herein.

The optical filter 102 may be configured to pass light beams associated with a spectral range (e.g., that impinge on the optical filter 102). That is, the optical filter 102 may be configured to pass light beams associated with wavelengths that are greater than or equal to a minimum wavelength associated with the spectral range and that are less than or equal to a maximum wavelength associated with the spectral range. For example, when the optical filter 102 is configured to pass light beams associated with a spectral range from 1530 nanometers (nm) to 1565 nm, the optical filter 102 may be configured to pass light beams associated with wavelengths that are greater than or equal to 1530 nm and less than or equal to 1565 nm.

In some implementations, the optical filter 102 may comprise an optical interference filter (e.g., a thin film optical interference filter). Additionally, or alternatively, the optical filter 102 may include, for example, a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, and/or glasses, among other examples), and/or another filter.

As shown in FIG. 1A, the optical filter 102 may include a plurality of channels 108. The plurality of channels 108 may be arranged in a regular pattern, such as an array (e.g., a one-dimensional array or a two-dimensional array), or another pattern. The plurality of channels 108 may be configured to respectively pass (e.g., to the optical sensor 106) light beams associated with the spectral range. Accordingly, a composition of a channel 108 may match (e.g., be the same as or similar to) a composition of each of the other channels 108 of the plurality of channels 108. For example, each channel 108 may comprise a set of thin film layers that comprise a same or similar number of thin film layers, a same or similar arrangement of the thin film layers, and/or a same or similar thickness of the thin film layers, among other examples.

In some implementations, the optical filter 102 may have an angle-dependent wavelength characteristic (with respect to the spectral range), also referred to as an angle shift characteristic (with respect to the spectral range). That is, the optical filter 102 may pass light beams associated with different subranges of the spectral range based on respective incidence angles of the light beams when the light beams impinge on the optical filter 102. For example, the optical filter 102 may pass first light beams that are associated with a first subrange of the spectral range and that impinge on the optical filter within a first incidence angle range, may pass second light beams that are associated with a second subrange of the spectral range and that impinge on the optical filter within a second incidence angle range, may pass third light beams that are associated with a third subrange of the spectral range and that impinge on the optical filter within a third incidence angle range, and so on. The angle shift characteristic may be represented by the following equation:

$$\lambda_\theta = \lambda_0 \left[1 - \frac{n_0}{n_e} \sin^2 \theta \right]^{1/2},$$

where $\lambda_\theta$ represents a peak wavelength at incidence angle $\theta$, $\lambda_0$ represents a peak wavelength at incidence angle 0, $n_0$ represents a refractive index of the incidence medium, $n_e$ represents an effective index of the optical filter 102, and $\theta$ is the incidence angle of a light beam. In some implementations, the optical filter 102 may be configured to pass light beams associated with shorter wavelengths as the light beams impinge on the optical filter 102 at greater incidence angles.

In some implementations, the plurality of channels 108 may be configured to have the angle shift characteristic (with respect to the spectral range) (e.g., each channel 108 may be configured to have the same angle shift characteristic). For example, each channel 108 may pass first light beams that are associated with a first subrange of the spectral range and that impinge on the channel 108 within a first incidence angle range, may pass second light beams that are associated with a second subrange of the spectral range and that impinge on the channel 108 within a second incidence angle range, may pass third light beams that are associated with a third subrange of the spectral range and that impinge on the channel 108 within a third incidence angle range, and so on. In some implementations, each channel 108 may be configured to pass light beams associated with shorter wavelengths as the light beams impinge the channel 108 at greater incidence angles.

Figure 1C:
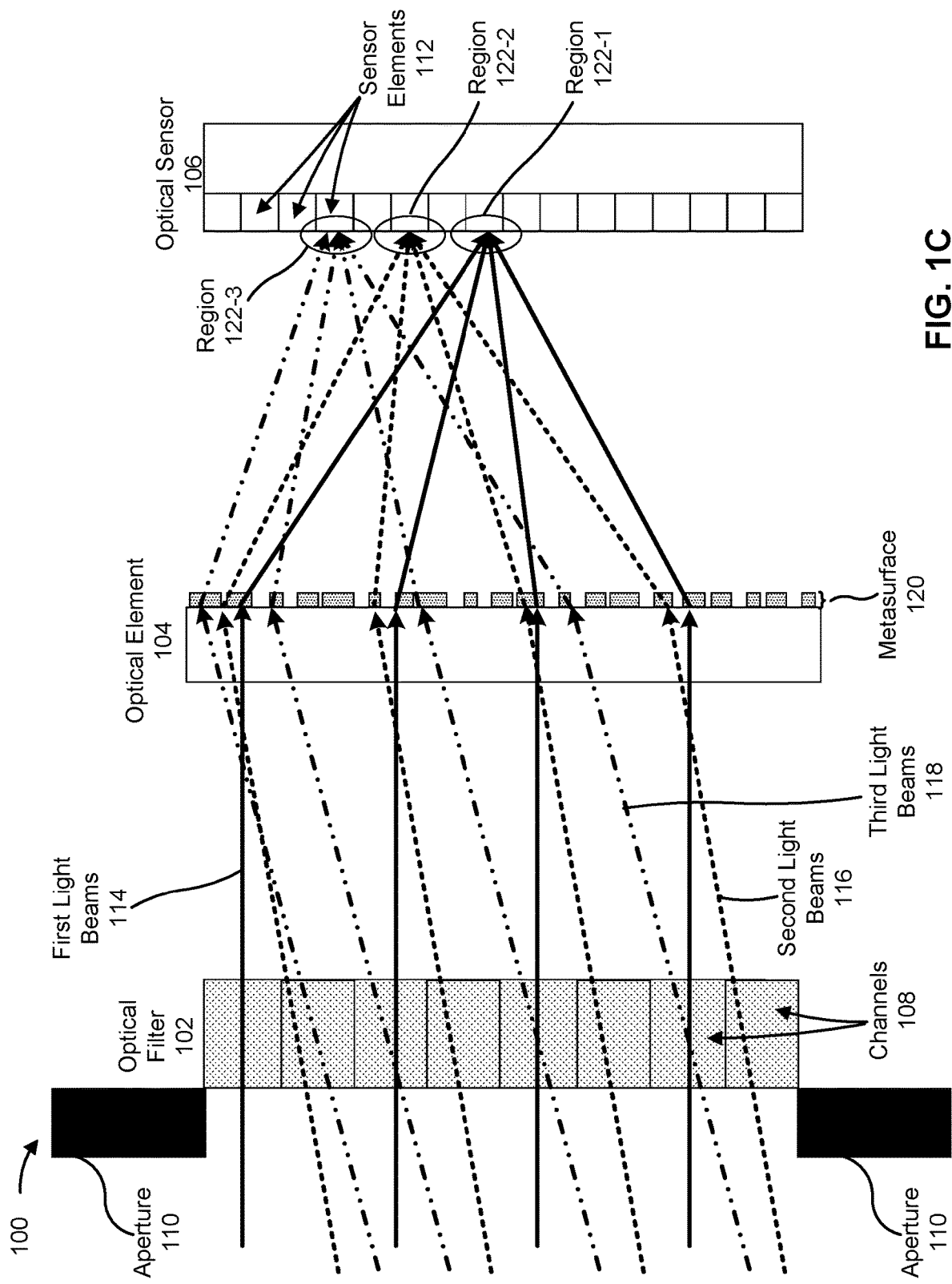

In some implementations, the optical filter 102 may include an aperture 110 (e.g., as shown in FIGS. 1B-1C), such as on an input surface of the optical filter 102, to allow light beams to impinge on the optical filter 102 and/or the plurality of channels 108. The aperture 110 may include a window, a lens, or any other type of transmissive optical element that receives light beams. The aperture 110 may include an aperture stop, or one or more other optical elements, to control an amount of light beams that impinge on the optical filter 102 and/or the plurality of channels 108, and/or to control a range of incidence angles of the light beams that impinge on the optical filter 102 and/or the plurality of channels 108 via the aperture 110.

The optical element 104 may be configured to cause light beams associated with different subranges of the spectral range and different respective incidence angles of the light beams (e.g., when the light beams impinge on the optical filter 102) to be directed to different regions of the optical sensor 106. That is, the optical element 104 may cause a light beam to have an exit trajectory (e.g., after passing through the optical element 104) that is different than (or, in some cases, the same as) an input trajectory (e.g., at an input surface of the optical element 104) of the light beam, wherein the exit trajectory is based on the subrange of the spectral range associated with the light beam and the incidence angle range of the light beam (e.g., when the light beam impinged on the optical filter 102).

The optical element 104 may include a lens (e.g., as shown in FIG. 1B), and/or one or more other optical elements, such as a reflective optical element, a transmissive optical element, a diffractive optical element, a catadioptric optical element, and/or a refractive optical element. Additionally, or alternatively, the optical element 104 may include a metasurface (e.g., metasurface 120, as shown in FIG. 1C). To include the metasurface, the optical element 104 may comprise one or more metamaterial structures on a surface of the optical element 104 (e.g., an exit surface of the optical element 104). The one or more metamaterial structures may include engineered structures (e.g., with an engineered shape, size, geometry, orientation, and/or the like) that have dimensions that are smaller than the one or more subranges of the spectral range and/or that are arranged in a pattern (e.g., a linear pattern) with distances between the engineered structures that are smaller than the one or more subranges. In some implementations, the one or more metamaterial structures may have a thickness (e.g., a distance between an input surface of the one or more metamaterial structures and an output surface of the one or more metamaterial structures) of approximately 100 nm to 2 micrometers (μm). The one or more metamaterial structures may produce a phase delay in light beams as the light beams propagate through the metasurface of the optical element 104 to the optical sensor 106 and thereby change a propagation direction of the light beams (e.g., cause the light beams to diffract, refract, or otherwise bend).

The optical sensor 106 may include a device capable of performing a measurement of light beams directed toward the optical sensor 106, such as a spectral sensor or a multi-spectral sensor. The optical sensor 106 may be, for example, a silicon (Si) based sensor, an indium-gallium-arsenide (InGaAs) based sensor, a lead-sulfide (PbS) based sensor, or a germanium (Ge) based sensor, may utilize one or more sensor technologies, such as a complementary metal-oxide-semiconductor (CMOS) technology, or a charge-coupled device (CCD) technology, among other examples. In some implementations, the optical sensor 106 may include a plurality of sensor elements 112 (e.g., an array of sensor elements, also referred to herein as a sensor array), each configured to obtain information. For example, a sensor element 112 may provide an indication of intensity of light beams that fall incident on the sensor element 112 (e.g., active/inactive, or a more granular indication of intensity). The optical sensor 106 may be configured to collect the information obtained by the one or more sensor elements 112 to generate sensor data.

As further shown in FIG. 1A, the optical filter 102 may be disposed over the optical element 104, which may be disposed over the optical sensor 106. In some implementations, the optical filter 102 may be directly disposed on the optical element 104 or may be separated from the optical filter 102 by a gap (e.g., a free space gap or a gap filled with a light transmissive medium, such as epoxy). Additionally, or alternatively, the optical element 104 may be directly disposed on the optical sensor 106 or may be separated from the optical sensor 106 by a gap (e.g., a free space gap or a gap filled with a light transmissive medium, such as epoxy).

As shown in FIGS. 1B-1C, first light beams 114, second light beams 116, and third light beams 118 may propagate to the optical filter 102. The first light beams 114, the second light beams 116, and the third light beams 118 may originate from a same origination point (or set of origination points) and may be associated with individual subranges of a spectral range. For example, the first light beams 114 may be associated with a first subrange of the spectral range, the second light beams 116 may be associated with a second subrange of the spectral range (e.g., that is not coextensive with the first subrange of the spectral range), and the third light beams 118 may be associated with a third subrange of the spectral range (e.g., that is not coextensive with the first subrange and the second subrange of the spectral range). The first light beams 114, the second light beams 116, and the third light beams 118 may be included in a laser beam (or another beam that includes collimated, or substantially collimated, light beams) associated with the spectral range (e.g., a laser beam that is used to facilitate orientation of an optical sensor device described herein with the origination point of the laser beam). The laser beam may include one or more additional light beams associated with other individual subranges of the spectral range. The laser beam may be emitted by an optical transmission device (e.g., a laser) that is associated with an origination optical communication device, such as a satellite, and may be modulated to include one or more optical communication messages.

As further shown in FIGS. 1B-1C, the first light beams 114, the second light beams 116, and the third light beams 118 may impinge on the optical filter 102 within individual incidence angle ranges. For example, the first light beams 114 may impinge on the optical filter 102 within a first incidence angle range (e.g., an incidence angle range that is greater than or equal to 0 degrees and less than 5 degrees), the second light beams 116 may impinge on the optical filter 102 within a second incidence angle range (e.g., that is not coextensive with the first incidence angle range, such as an incidence angle range that is greater than or equal to 5 degrees and less than 10 degrees), and the third light beams 118 may impinge on the optical filter 102 within a third incidence angle range (e.g., that is not coextensive with the first incidence angle range and the second incidence angle range, such as an incidence angle range that is greater than or equal to 10 degrees and less than 15 degrees). In some implementations, a particular first light beam 114, a particular second light beam 116, and a particular third light beam 118 may impinge on a particular channel 108 within respective incidence angle ranges. For example, the particular first light beam 114 may impinge on the particular channel 108 within the first angle range, the particular second light beam 116 may impinge on the particular channel 108 within the second angle range, and the particular third light beam 118 may impinge on the particular channel 108 within the third angle range.

Accordingly, as further shown in FIGS. 1B-1C, the optical filter 102 (e.g., because the optical filter 102 and/or the plurality of channels 108 have an angle shift characteristic with respect to the spectral range, as discussed elsewhere herein), may pass the first light beams 114, the second light beams 116, and the third light beams 118. For example, the particular channel 108 may pass the particular first light beam 114, the particular second light beam 116, and the particular third light beam 118. The optical filter 102 may pass the first light beams 114 such that the first light beams 114 exit the optical filter 102 within a first exit angle range, may pass the second light beams 116 such that the second light beams 116 exit the optical filter 102 within a second exit angle range, and may pass the third light beams 118 such that the third light beams 118 exit the optical filter 102 within a third exit angle range. For example, the particular channel 108 may pass the particular first light beam 114 such that the particular first light beam 114 exits the particular channel 108 within the first exit angle range, may pass the particular second light beam 116 such that the particular second light beam 116 exits the particular channel 108 within the second exit angle range, and may pass the particular third light beam 118 such that the particular third light beam 118 exits the particular channel 108 within the third exit angle range.

The first exit angle range may be associated with the first incidence angle range (e.g., may be the same as the first incidence angle range, or may be a function of the first incidence angle range), the second exit angle range may be associated with the second incidence angle range (e.g., may be the same as the second incidence angle range, or may be a function of the second incidence angle range), and/or the third exit angle range may be associated with the third incidence angle range (e.g., may be the same as the third incidence angle range, or may be a function of the third incidence angle range). The first exit angle range, the second exit angle range, and the third exit angle range may not be coextensive.

As further shown in FIGS. 1B-1C, the optical filter 102 may pass the first light beams 114, the second light beams 116, and the third light beams 118 to the optical element 104. For example, the particular channel 108 may pass the particular first light beam 114, the particular second light beam 116, and the particular third light beam 118 to the optical element 104. As shown in FIG. 1B, the optical element 104 may include a lens. Additionally, or alternatively, as shown in FIG. 1C, the optical element 104 may include the metasurface 120.

The optical element 104 may cause the first light beams 114, the second light beams 116, and the third light beams 118 to be directed to the optical sensor 106. The optical sensor 106 may include one or more regions 122 (shown as regions 122-1 through 122-3 in FIGS. 1B-1C), such as on an input surface of the optical sensor 106. Accordingly, the optical element 104 may cause the light beams to be directed to individual regions 122 of the optical sensor 106. For example, the optical element 104 may cause, based on receiving the first light beams 114 (e.g., based on the first subrange of the spectral range and/or the first exit angle range associated with the first light beams 114), the first light beams 114 to be directed to the first region 122-1 of the optical sensor 106; may cause, based on receiving the second light beams 116 (e.g., based on the second subrange of the spectral range and/or the second exit angle range associated with the second light beams 116), the second light beams 116 to be directed to the second region 122-2 of the optical sensor 106; and may cause, based on receiving the third light beams 118 (e.g., based on the third subrange of the spectral range and/or the third exit angle range associated with the third light beams 118), the third light beams 118 to be directed to the third region 122-3 of the optical sensor 106. The first region 122-1, the second region 122-2, and the third region 122-3 may not be coextensive.

As further shown in FIGS. 1B-1C, each region 122 of the optical sensor 106 may be associated with one or more sensor elements. For example, the first region 122-1 may be associated with a first set of one or more sensor elements, the second region 122-2 may be associated with a second set of one or more sensor elements, and the third region 122-3 may be associated with a third set of one or more sensor elements. Accordingly, the first set of one or more sensor elements, the second set of one or more sensor elements, and the third set of one or more sensor elements may not be coextensive. Further, the first set of one or more sensor elements may be associated with the first subrange of the spectral range, the first incidence angle range, and the first exit angle range (e.g., because the first light beams 114 propagate to the first set of one or more sensor elements via the optical filter 102 and the optical element 104, as described herein); the second set of one or more sensor elements may be associated with the second subrange of the spectral range, the second incidence angle range, and the second exit angle range (e.g., because the second light beams 116 propagate to the second set of one or more sensor elements via the optical filter 102 and the optical element 104, as described herein); and the third set of one or more sensor elements may be associated with the third subrange of the spectral range, the third incidence angle range, and the third exit angle range (e.g., because the third light beams 118 propagate to the third set of one or more sensor elements via the optical filter 102 and the optical element 104, as described herein).

As shown in FIG. 1D, the optical sensor 106 may be associated with one or more processors 124 and may provide, as shown by reference number 126, sensor data to the one or more processors 124. The sensor data may indicate information relating to the light beams that originated at the origination point (e.g., the first light beams 114, the second light beams 116, the third light beams 116, and/or other light beams) and that passed through the optical filter 102 (e.g., via the plurality of channels 108) and that were directed to the optical sensor by the optical element 104. For example, the sensor data may indicate an intensity of the light beams that are received by the plurality of sensor elements 112 of the optical sensor 106.

Accordingly, the sensor data may indicate an intensity of light beams associated with a subrange of the spectral range, an incidence angle range, and/or an exit angle range that were received by each set of one or more sensor elements 112 of the optical sensor 106. For example, the sensor data may indicate an intensity of the first light beams 114 (that are associated with the first subrange of the spectral range, the first incidence angle range, and the first exit angle range) that were received by the first set of sensor elements 112, may indicate an intensity of the second light beams 116 (that are associated with the second subrange of the spectral range, the second incidence angle range, and the second exit angle range) that were received by the second set of sensor elements 112, and may indicate an intensity of the third light beams 118 (that are associated with the third subrange of the spectral range, the third incidence angle range, and the third exit angle range) that were received by the third set of sensor elements 112.

As further shown in FIG. 1D, and by reference number 128, the one or more processors 124 may process the sensor data to determine orientation information (e.g., associated with the origination point of the light beams). For example, the one or more processors 124 may identify, based on the sensor data, a particular set of one or more sensor elements 112 of the optical sensor 106 that received particular light beams. The one or more processors 124 may determine, such as based on configuration information associated with the optical filter 102, the optical element 104, and/or the optical sensor 106 (e.g., that is stored in a data structure that is accessible by the one or more processors 124), that the particular set of one or more sensor elements 112 are associated with a particular subrange of the spectral range, a particular incidence angle range, and/or a particular exit angle range. Accordingly, the one or more processors 124 may determine, based on an intensity of the particular light beams and the particular subrange of the spectral range, the particular incidence angle range, and/or the particular exit angle range, the orientation information. The orientation information may indicate, for example, an orientation of the optical filter 102, the optical element 104, and/or the optical sensor 106 (or an optical sensor device that includes the optical filter 102, the optical element 104, and/or the optical sensor 106) with respect to the origination point. In some implementations, the one or more processors 124 may process the sensor data to determine intensity values associated with multiple subranges of the spectral range, incidence angle ranges, and/or exit angle ranges of light beams received by the optical sensor 106 to determine the orientation information.

In some implementations, the one or more processors 124 may provide the orientation information to another device, such as a control device. For example, the one or more processors 124 may send the orientation information to the control device to cause the control device to orient the optical filter 102, the optical element 104, and/or the optical sensor 106 (or an optical sensor device that includes the optical filter 102, the optical element 104, and/or the optical sensor 106) with respect to the origination point. In a specific example, when the control device and the optical sensor device are associated with an optical communication device, such as a satellite, the control device may cause the optical communication device to perform one or more movements (e.g., by engaging one or more thrusters or other components of the optical communication device) to enable orientation of the optical sensor device with the origination point.

In some implementations, the one or more processors 124 may process the sensor data to identify one or more optical communication messages, such as those included in a modulated laser beam (e.g., that includes modulated first light beams 114, second light beams 116, and/or third light beams 118) transmitted by an origination optical communication device, such as an origination satellite, associated with the origination point. For example, the one or more processors 124 may process (e.g., using one or more optical communication processing techniques) the sensor data to identify the one or more optical communication messages, and may determine that the one or more optical communication messages originated at the origination point. Accordingly, the one or more processors 124 may determine (e.g., based on the one or more sensor elements 112 used to generate the sensor data and/or other information indicating the spectral range of the modulated laser beam) that the one or more optical communication messages are associated with the origination optical communication device (and not another optical communication device).

The one or more processors 124 may provide optical communication information (e.g., that indicates the one or more optical communication messages, the origination point, and/or the origination optical communication device, among other examples) to another device, such as the control device. For example, the one or more processors 124 may send the optical communication information to the control device to allow the control device to cause the optical communication device to communicate with the origination optical communication device (e.g., by enabling the optical communication device to emit another modulated laser beam that includes one or more other optical communication messages to the origination optical communication device).

While some implementations described herein are described in relation to orientation and communication examples between two optical communication devices, other implementations are directed to more than two optical communication devices. For example, an optical sensor device that includes the optical filter 102, the optical element 104, and/or the optical sensor 106 that is associated with optical communication device may receive sets of light beams associated with laser beams respectively emitted by a plurality of origination optical communication devices (that are associated with respective origination points and respective spectral ranges). The optical sensor 106 therefore may provide sensor data associated with each laser beam that is associated with an origination optical communication device (and the origination point of the origination optical communication device). Accordingly, the one or more processors 124 may process each instance of sensor data to determine orientation information and/or the one or more optical communication messages associated with an associated origination optical communication device (and its origination point), in a similar manner as discussed elsewhere herein.

As indicated above, FIGS. 1A-1D are provided as examples. Other examples may differ from what is described with regard to FIGS. 1A-1D.

Figure 2A:
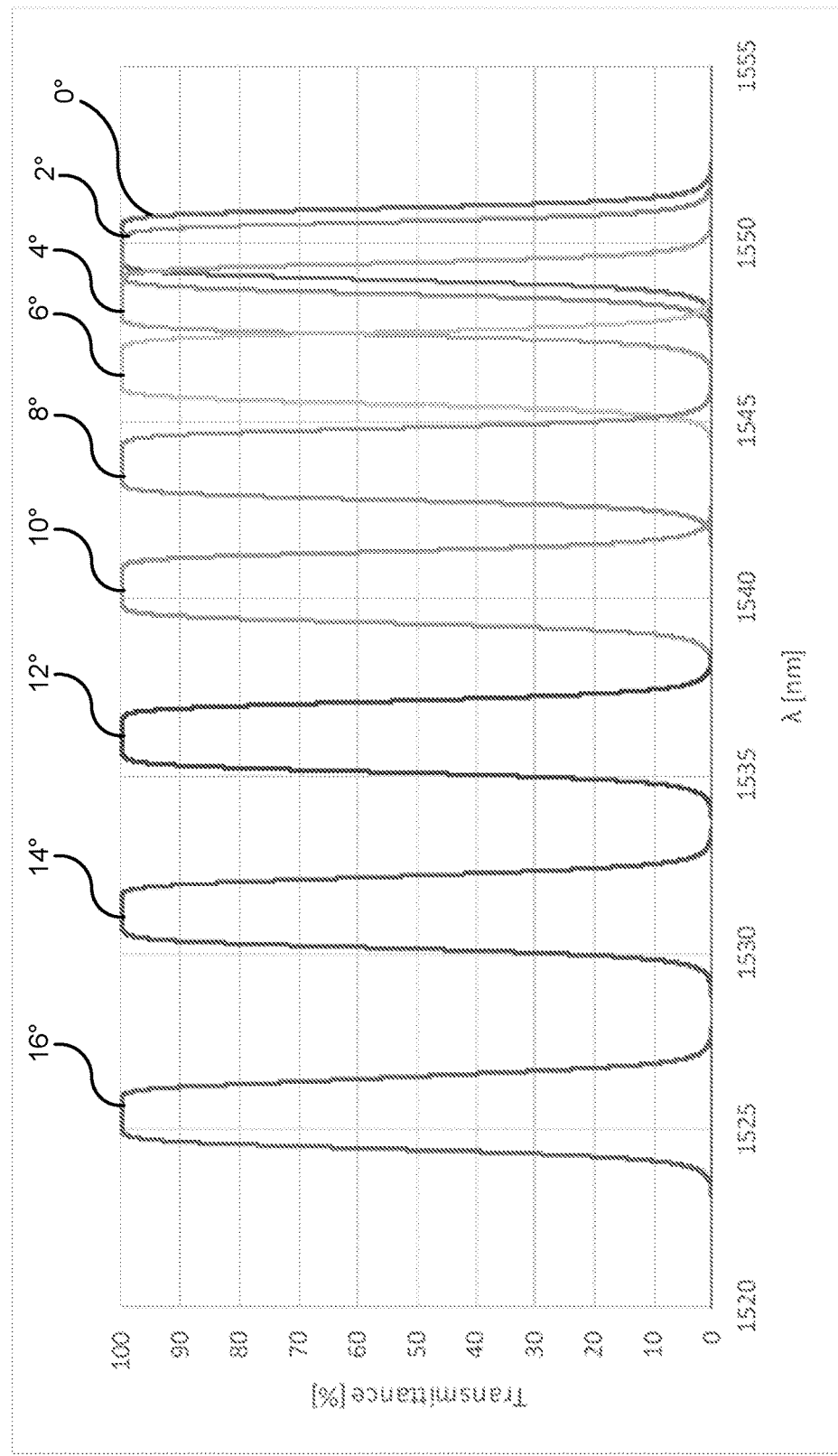
FIGS. 2A-2B are plots related to an angle shift characteristic of an example optical filter described herein.
Figure 2B:
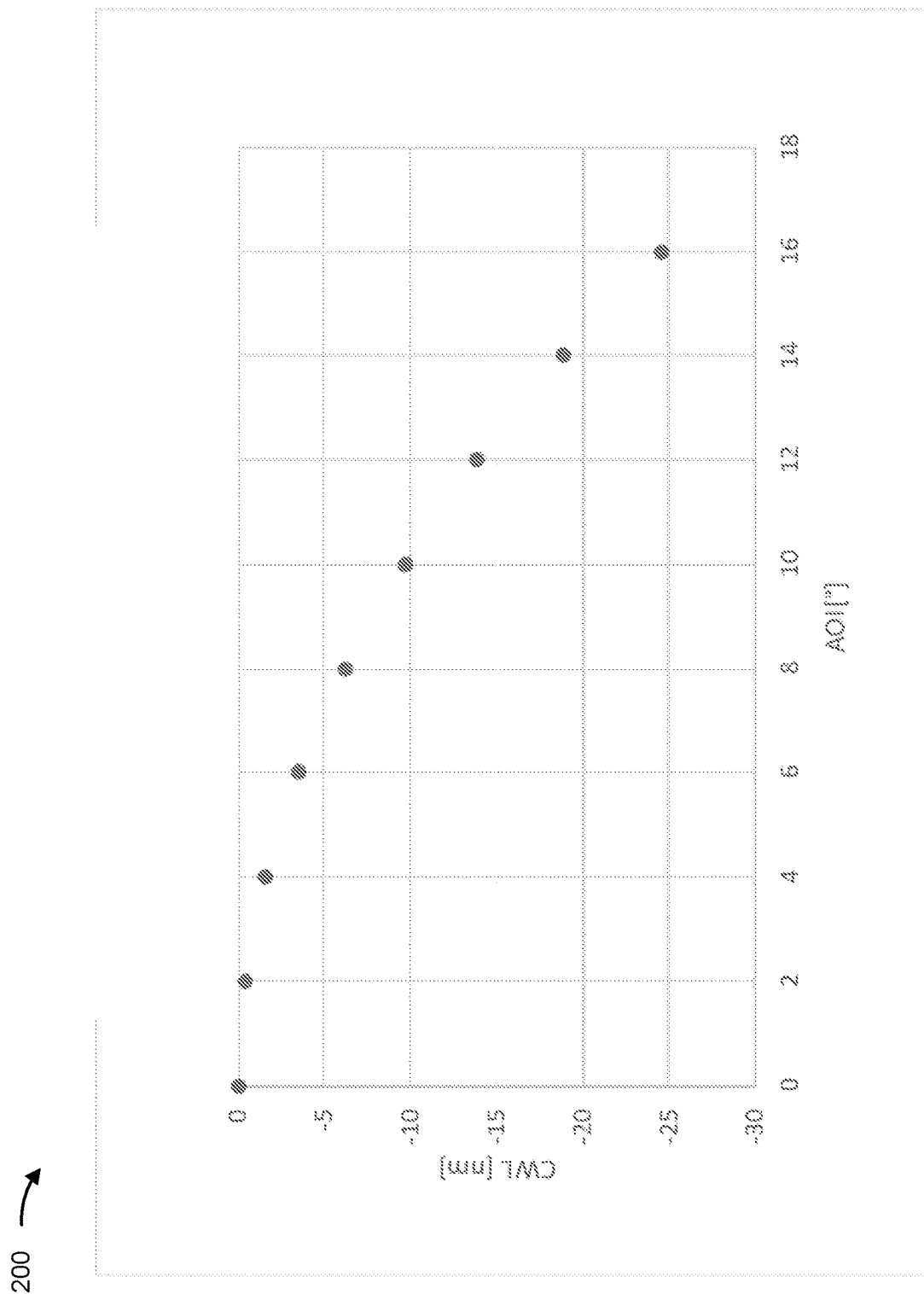

FIGS. 2A-2B are plots related to an angle shift characteristic of an example optical filter 102. FIG. 2A shows that optical filter 102 passes different subranges of a spectral range (e.g., from 1520 to 1555 nm) based on an incidence angle (e.g., from 0 degrees to 16 degrees) of a light beam that impinges on the optical filter 102. FIG. 2B shows a shift (in nm) associated with a center wavelength of the different subranges based on incidence angle (shown as angle of incidence (AOI)). As indicated by FIGS. 2A-2B, the optical filter 102 may be configured to pass light beams associated with shorter wavelengths as the light beams impinge on the optical filter 102 at greater incidence angles.

As indicated above, FIGS. 2A-2B are provided as examples. Other examples may differ from what is described with regard to FIGS. 2A-2B.

FIG. 3 is a diagram of an example environment 300 in which systems and/or methods described herein may be implemented. As shown in FIG. 3, environment 300 may include an optical sensor device 310 that may include one or more processors 320 (e.g., that correspond to the one or more processors 124 described herein in relation to FIG. 1D) and an optical sensor 330 (e.g., that corresponds to the optical sensor 106 described herein in relation to FIGS. 1A-1D). The optical sensor device may additionally include an optical filter (e.g., that corresponds to the optical filter 102 described herein in relation to FIGS. 1A-1D) and an optical element (e.g., that corresponds to the optical element 104 described herein in relation of FIGS. 1A-1D). The environment 300 may also include a control device 340 and a network 350. Devices of environment 300 may interconnect via wired connections, wireless connections, or a combination of wired and wireless connections.

Optical sensor device 310 may include an optical device capable of determining, storing, processing, and/or routing information, such as orientation information (e.g., that is associated with an origination point of light beams). In this case, optical sensor device 310 may determine and/or utilize associations between spectral range subranges and incidence angle ranges (e.g., of light beams that impinge on the optical filter of the optical sensor device 310). In some implementations, optical sensor device 310 may be incorporated into control device 340. In some implementations, optical sensor device 310 may receive information from and/or transmit information to another device in environment 300, such as control device 340. Optical sensor device 310 may be associated with an optical communication device, such as a satellite. For example, optical sensor device 310 may be configured to facilitate orientation of optical sensor device 310 (and therefore the optical communication device) with the origination point of the light beams.

Optical sensor device 310 may include one or more processors 320, described in more detail in connection with FIG. 4. Optical sensor device 310 may include an optical sensor 330. Optical sensor 330 includes a device capable of sensing light. For example, optical sensor 330 may include an image sensor, a multispectral sensor, a spectral sensor, and/or the like. In some implementations, optical sensor 330 may include an Si based sensor, an InGaAs based sensor, a PbS based sensor, or a Ge based sensor, and may utilize one or more sensor technologies, such as a CMOS technology, or a CCD technology, among other examples. In some implementations, optical sensor 330 may include a front-side illumination (FSI) sensor, a back-side illumination (BSI) sensor, and/or the like.

Control device 340 includes one or more devices capable of receiving, generating, storing, processing, and/or providing information, such as the orientation information described herein. Control device 340 may include a communication device and/or a computing device. For example, the control device 340 may include a wireless communication device, a wired communication device, or a combination wired and wireless communication device. In some implementations, control device 340 may receive information from and/or transmit information to another device in environment 300, such as optical sensor device 310. Control device 340 may be associated with an optical communication device, such as a satellite. For example, control device 340 may be configured to control movement of the optical communication device.

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. For example, although optical sensor device 310 and control device 340 are described as separate devices, optical sensor device 310 and control device 340 may be implemented as a single device. Additionally, or alternatively, a set of devices (e.g., one or more devices) of environment 300 may perform one or more functions described as being performed by another set of devices of environment 300.

Figure 4:
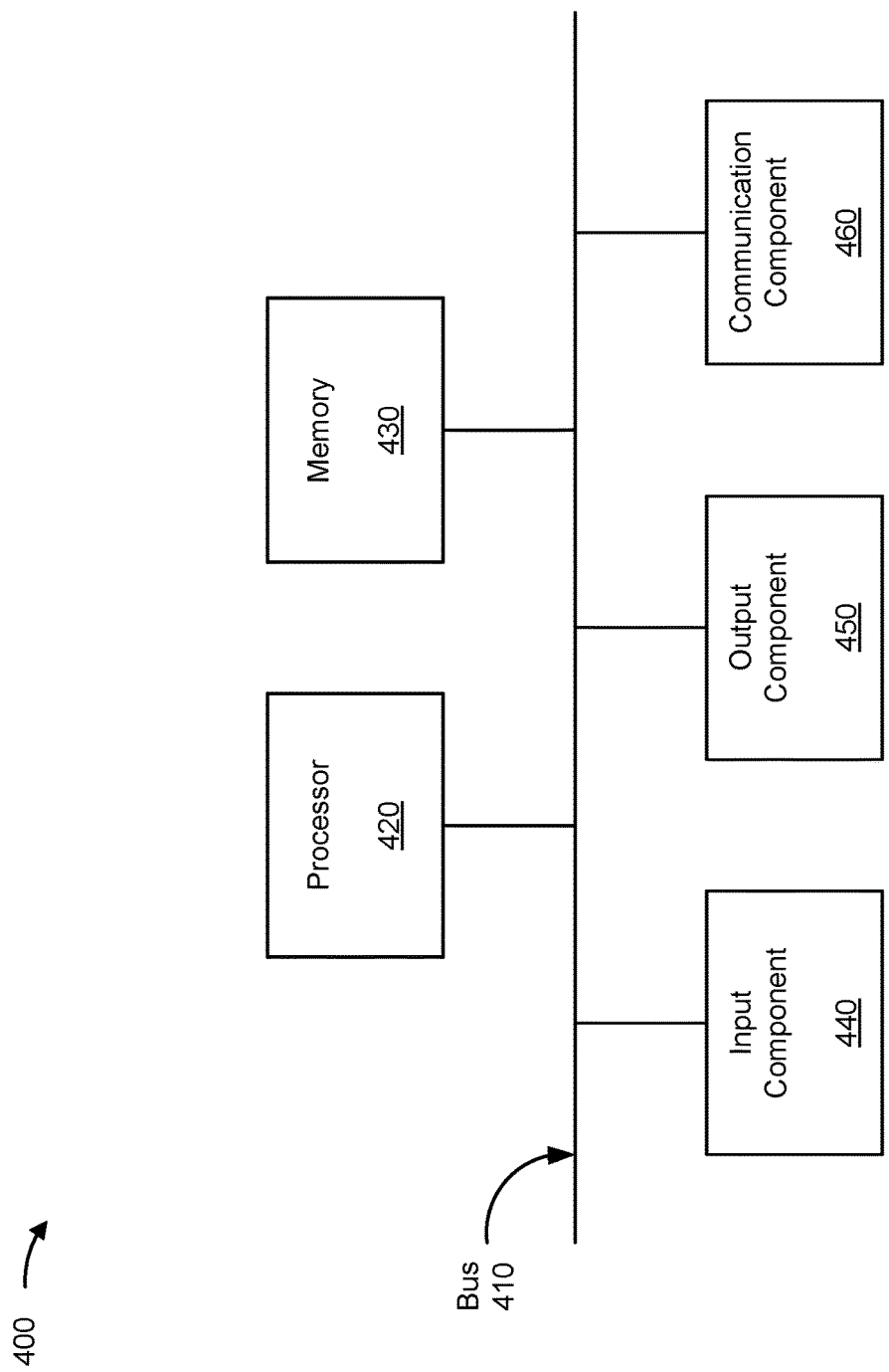
FIG. 4 is a diagram of example components of a device.

FIG. 4 is a diagram of example components of a device 400. The device 400 may correspond to optical sensor device 310 and/or control device 340. In some implementations, optical sensor device 310 and/or control device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
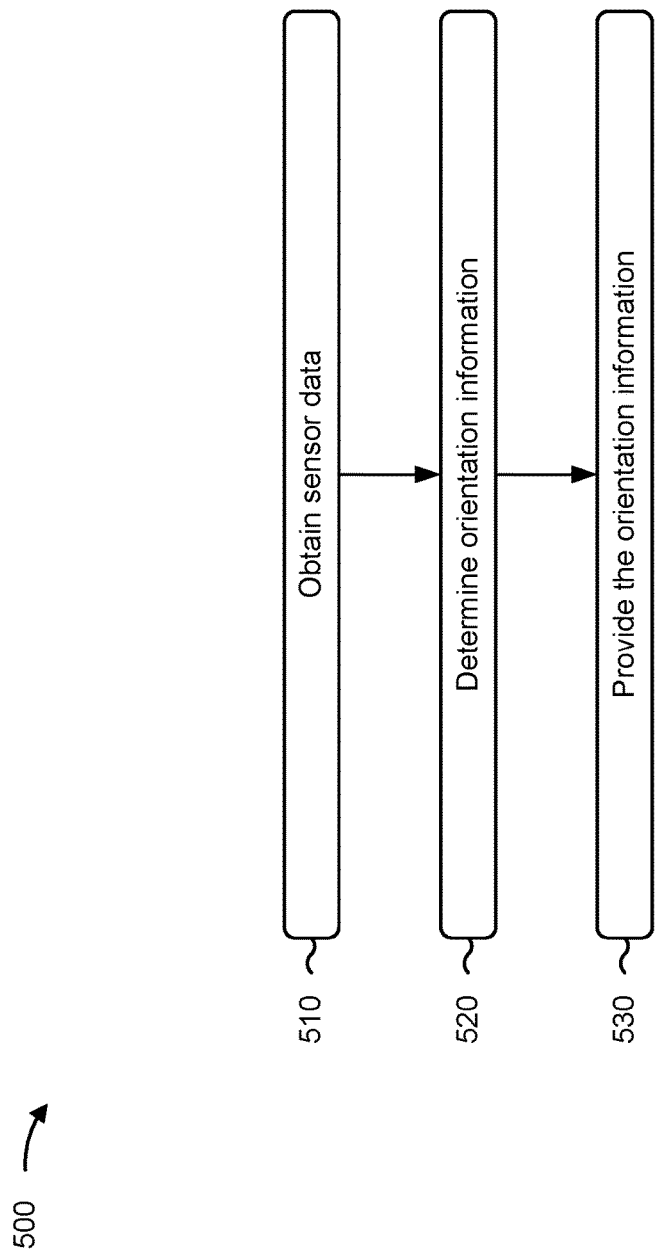
FIG. 5 is a flowchart of an example process associated with an optical sensor device described herein.

FIG. 5 is a flowchart of an example process 500 associated with an optical sensor device (e.g., optical sensor device 310). In some implementations, one or more process blocks of FIG. 5 may be performed by one or more processors (e.g., one or more processors 124 or one or more processors 320) of the optical sensor device. In some implementations, one or more process blocks of FIG. 5 may be performed by another device or a group of devices separate from or including the one or more processors, such as a control device (e.g., control device 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include obtaining sensor (block 510). For example, the one or more processors may obtain sensor data, as described above.

As further shown in FIG. 5, process 500 may include determining orientation information (block 520). For example, the one or more processors may determine, based on the sensor data, orientation information, as described above.

As further shown in FIG. 5, process 500 may include providing the orientation information (block 530). For example, the one or more processors may provide the orientation information, as described above.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical sensor device, comprising:
an optical filter that includes a plurality of channels that are configured to pass light beams associated with a spectral range, wherein each channel, of the plurality of channels, is configured to have a same angle shift characteristic with respect to the spectral range;
an optical element;
an optical sensor that includes a plurality of sensor elements, wherein:
the optical filter is configured to:
pass, to the optical element, first light beams, of the light beams, that are associated with a first subrange of the spectral range and that impinge on the optical filter within a first incidence angle range, and
pass, to the optical element, second light beams, of the light beams, that are associated with a second subrange of the spectral range and that impinge on the optical filter within a second incidence angle range; and
the optical element is configured to:
cause, based on receiving the first light beams, the first light beams to be directed to a first set of one or more sensor elements of the plurality of sensor elements of the optical sensor, and
cause, based on receiving the second light beams, the second light beams to be directed to a second set of one or more sensor elements of the plurality of sensor elements of the optical sensor; and
one or more processors configured to:
obtain, from the optical sensor, sensor data associated with the first light beams and the second light beams,
determine orientation information, associated with an origination point of the first light beams and the second light beams, based on the sensor data and based on information regarding the first subrange of the spectral range and the second subrange of the spectral range, and
provide the orientation information.

2. The optical sensor device of claim 1, wherein the same angle shift characteristic is represented by a same equation that defines a peak wavelength at an incidence angle.

3. The optical sensor device of claim 1, wherein the first subrange of the spectral range and the second subrange of the spectral range are not coextensive.

4. The optical sensor device of claim 1, wherein the first incidence angle range and the second incidence angle range are not coextensive.

5. The optical sensor device of claim 1, wherein the first set of one or more sensor elements and the second set of one or more sensor elements are not coextensive.

6. The optical sensor device of claim 1, wherein the optical filter is directly disposed on the optical element.

7. The optical sensor device of claim 1, wherein the optical filter is disposed over the optical element, wherein the optical element and the optical filter are separated by a gap.

8. An optical sensor device, comprising:
an optical filter that includes a plurality of channels, wherein each channel, of the plurality of channels, is configured to have a same angle shift characteristic with respect to a spectral range; and
an optical element, wherein:
a channel, of the plurality of channels of the optical filter, is configured to:
pass, to the optical element, first light beams that are associated with a first subrange of a spectral range and that impinge on the channel within a first incidence angle range, and
pass, to the optical element, second light beams that are associated with a second subrange of the spectral range and that impinge on the channel within a second incidence angle range; and
the optical element is configured to:
cause, based on receiving the first light beams, the first light beams to be directed to a first set of one or more sensor elements of an optical sensor, and
cause, based on receiving the second light beams, the second light beams to be directed to a second set of one or more sensor elements of the optical sensor.

9. The optical sensor device of claim 8, wherein the channel is further configured to:
pass, to the optical element, the first light beams such that first light beams exit the channel within a first exit angle range that is associated with the first incidence angle range; and
pass, to the optical element, the second light beams such that second light beams exit the channel within a second exit angle range that is associated with the second incidence angle range.

10. The optical sensor device of claim 9, wherein the first exit angle range and the second exit angle range are not coextensive.

11. The optical sensor device of claim 8, wherein:
the first set of one or more sensor elements are associated with a first region of the optical sensor;
the second set of one or more sensor elements are associated with a second region of the optical sensor; and
the first region of the optical sensor and the second region of the optical sensor are not coextensive.

12. The optical sensor device of claim 8, wherein:
the first set of one or more sensor elements are associated with the first subrange of the spectral range and the first incidence angle range; and
the second set of one or more sensor elements are associated with the second subrange of the spectral range and the second incidence angle range.

13. The optical sensor device of claim 8, further comprising:
one or more processors are configured to:
obtain, from the optical sensor, sensor data associated with modulation of the first light beams and the second light beams;
determine, based on the sensor data, one or more optical communication messages associated with an origination point of the first light beams and the second light beams; and
provide optical communication information that indicates the one or more optical communication messages.

14. The optical sensor device of claim 8, wherein the optical filter includes an aperture on an input surface of the optical filter.

15. An optical sensor device, comprising:
an optical filter that includes a plurality of channels that are configured to pass light beams associated with a spectral range, wherein each channel, of the plurality of channels, is configured to have a same angle shift characteristic with respect to the spectral range; and
an optical element, wherein:
the optical filter is configured to:
pass, to the optical element, first light beams, of the light beams, that are associated with a first subrange of a spectral range and that impinge on the optical filter within a first incidence angle range, and
pass, to the optical element, second light beam, of the light beams, that are associated with a second subrange of the spectral range and that impinge on the optical filter within a second incidence angle range.

16. The optical sensor device of claim 15, wherein the optical filter comprises a thin film optical interference filter.

17. The optical sensor device of claim 15, wherein the optical element includes at least one of:
a metasurface,
a lens,
a reflective optical element,
a transmissive optical element,
a diffractive optical element,
a catadioptric optical element,
a refractive optical element, or
a metamaterial structure.

18. The optical sensor device of claim 1, wherein, to determine the orientation information, the one or more processors are configured to:
identify, based on the sensor data, that the first set of one or more sensor elements received the first light beams,
determine, based on configuration information associated with the optical sensor device, that the first set of one or more sensor elements is associated with the first subrange of the spectral range, and
determine, based on an intensity of the first light beams and the first subrange of the spectral range, the orientation information.

19. The optical sensor device of claim 15, further comprising:
one or more are processors configured to:
identify a set of one or more sensor elements that received the first light beams; and
determine, based on identifying the set of one or more sensor elements that received the first light beams and based on an intensity of the first light beams, orientation information that indicates an orientation of the optical filter or the optical element with respect to an origination point of the first light beams.

20. The optical sensor device of claim 15, further comprising:
an optical sensor configured to provide sensor data indicating information relating to the first light beams and the second light beams after the first light beams and the second light beams originated at an origination point, passed through the optical filter, and were directed to the optical sensor by the optical element; and
one or more processors configured to determine, based on the sensor data indicating information relating to the first light beams and the second light beams, orientation information associated with the origination point.

* * * * *